United States Patent
Tatarkiewicz (10) Patent No.: US 10,819,915 B1
(45) Date of Patent: Oct. 27, 2020

(54) APPARATUS AND METHOD GENERATING HIGH DYNAMIC RANGE VIDEO

(71) Applicant: HORIBA Instruments Incorporated, Irvine, CA (US)

(72) Inventor: Jan J. Tatarkiewicz, San Diego, CA (US)

(73) Assignee: HORIBA INSTRUMENTS INCORPORATED, Irvine, CA (US)

(*) Notice: Subject to any disclaimer, the term of this patent is extended or adjusted under 35 U.S.C. 154(b) by 0 days.

(21) Appl. No.: 16/844,818

(22) Filed: Apr. 9, 2020

Related U.S. Application Data (63) Continuation-in-part of application No. 16/737,537, filed on Jan. 8, 2020, now Pat. No. 10,620,104, which is a continuation-in-part of application No. 16/668,311, filed on Oct. 30, 2019, now Pat. No. 10,613,012.

(60) Provisional application No. 62/952,761, filed on Dec. 23, 2019, provisional application No. 62/916,577, filed on Oct. 17, 2019.

(51) Int. Cl.
*G06K 9/00* (2006.01)
*H04N 5/235* (2006.01)

(52) U.S. Cl.
CPC ......... *H04N 5/2355* (2013.01); *H04N 5/2351* (2013.01); *H04N 5/2353* (2013.01); *H04N 5/2354* (2013.01)

(58) Field of Classification Search
None
See application file for complete search history.

(56) References Cited

U.S. PATENT DOCUMENTS

| | | | |
|---|---|---|---|
| 5,638,119 A | 6/1997 | Cornuejols | |
| 6,115,065 A | 9/2000 | Yadid-Pecht | |
| 9,131,201 B1* | 9/2015 | Geiss | H04N 5/235 |
| 9,491,441 B2 | 11/2016 | Sarmast | |
| 9,648,248 B2* | 5/2017 | Gupta | H04N 5/2352 |
| 2014/0347521 A1* | 11/2014 | Hasinoff | H04N 5/265 348/239 |
| 2015/0312463 A1* | 10/2015 | Gupta | H04N 5/2355 348/239 |
| 2019/0073751 A1* | 3/2019 | Sekine | G06T 7/246 |
| 2019/0166298 A1 | 5/2019 | Tasdizen | |
| 2019/0238725 A1 | 8/2019 | Kiser | |
| 2019/0253602 A1* | 8/2019 | Lee | H04N 5/355 |
| 2019/0335079 A1* | 10/2019 | Koizumi | H04N 5/2353 |
| 2019/0335211 A1 | 10/2019 | Tsukagoshi | |
| 2019/0349509 A1 | 11/2019 | Zhai | |
| 2019/0362646 A1 | 11/2019 | Hsu | |
| 2019/0364263 A1 | 11/2019 | Jannard | |

(Continued)

FOREIGN PATENT DOCUMENTS

| WO | 2019158405 | 8/2019 |
|---|---|---|

OTHER PUBLICATIONS

A 1280x960 3.75um pixel CMOS imager with Triple Exposure HDR, Johannes Solhusvik et al.

*Primary Examiner* — Soo Jin Park
(74) *Attorney, Agent, or Firm* — Manuel de la Cerra (57) ABSTRACT

The disclosure provides for a novel system for generating a high dynamic range video of a colloid under investigation. This helps record images of various sizes of nanoparticles that scatter light with very different efficiencies (effective cross-sections), typically orders of magnitude different.

13 Claims, 9 Drawing Sheets

(56) References Cited

U.S. PATENT DOCUMENTS

2019/0370948 A1* 12/2019 Tico .................... G06K 9/46
2019/0373290 A1   12/2019 Schieier \* cited by examiner

APPARATUS AND METHOD GENERATING HIGH DYNAMIC RANGE VIDEO

2.0 RELATED APPLICATIONS

This application claim priority as the non-provisional of U.S. Patent Application 62/952,761 filed on Dec. 23, 2019, as the non-provisional of U.S. Patent Application 62/916,577 filed on Oct. 17, 2019, and as a continuation-in-part of U.S. patent application Ser. No. 16/737,537 filed on Jan. 8, 2020, which is a continuation-in-part of U.S. patent application Ser. No. 16/668,311 filed on Oct. 30, 2019, now U.S. Pat. No. 10,613,012 issued on Apr. 7, 2020. The disclosure of each of these applications is herein incorporated by reference in their entireties.

This is related to U.S. patent application Ser. No. 16/362,636 filed on Mar. 23, 2019, titled "IMPROVED METHOD FOR DETERMINING THE SIZE OF NANOPARTICLES IN A COLLOID"; U.S. patent application Ser. No. 16/391,870 filed on May 23, 2019, titled "IMPROVED METHOD FOR DETERMINING THE SIZE OF NANOPARTICLES IN A COLLOID"; U.S. patent application Ser. No. 16/576,501 filed on Sep. 19, 2019, titled "IMPROVED METHOD FOR DETERMINING THE SIZE OF NANOPARTICLES IN A COLLOID"; U.S. patent application Ser. No. 16/431,274 filed on Jun. 4, 2019, titled "APPARATUS AND METHOD FOR THREE-DIMENSIONAL IMAGE ANALYSIS FOR PARTICLE VOLUME DETERMINATION"; U.S. patent application Ser. No. 16/528,044 filed on Jul. 31, 2019, titled "APPARATUS AND METHOD FOR ANALYZING PARTICLES"; U.S. Patent Application No. 62/357,777 filed on Jul. 1, 2016, titled "METHOD FOR CALIBRATING INVESTIGATED VOLUME FOR LIGHT SHEET BASED NANOPARTICLE TRACKING AND COUNTING APPARATUS"; U.S. Patent Application No. 62/372,025 filed on Aug. 8, 2016, titled "METHOD FOR CALIBRATING INVESTIGATED VOLUME FOR LIGHT SHEET BASED NANOPARTICLE TRACKING AND COUNTING APPARATUS"; U.S. Patent Application No. 62/421,585 filed on Nov. 14, 2016, titled "METHOD FOR CALIBRATING INVESTIGATED VOLUME FOR LIGHT SHEET BASED NANOPARTICLE TRACKING AND COUNTING APPARATUS", U.S. Patent Application No. 62/241,354 filed on Oct. 14, 2015, titled "APPARATUS FOR MEASUREMENTS OF GROWTH OR DISSOLUTION KINETICS OF COLLOIDAL NANOPARTICLE"; U.S. patent application Ser. No. 15/293,180 filed on Oct. 16, 2016, titled "APPARATUS AND METHOD FOR MEASUREMENT OF GROWTH OR DISSOLUTION KINETICS OF COLLOIDAL PARTICLES"; U.S. patent application Ser. No. 15/018,532 filed on Feb. 8, 2016, titled "MULTI-CAMERA APPARATUS FOR OBSERVATION OF MICROSCOPIC MOVEMENTS AND COUNTING OF PARTICLES IN COLLOIDS AND ITS CALIBRATION"; U.S. patent application Ser. No. 15/194,823 filed on Jun. 28, 2016, titled "SPECIAL PURPOSE CUVETTE ASSEMBLY AND METHOD FOR OPTICAL MICROSCOPY OF NANOPARTICLES IN LIQUIDS" issued on Jan. 10, 2017 as U.S. Pat. No. 9,541,490; U.S. patent application Ser. No. 14/730,138 filed on Jun. 3, 2015, titled "NANOPARTICLE ANALYZER", issued on May 9, 2017 as U.S. Pat. No. 9,645,070; U.S. patent application Ser. No. 15/399,679 filed on Jan. 5, 2017, titled "SPECIAL PURPOSE CUVETTE ASSEMBLY AND METHOD FOR OPTICAL MICROSCOPY OF NANOPARTICLES IN LIQUIDS"; U.S. patent application Ser. No. 15/594,967 filed on May 15, 2017, titled "SPECIAL PURPOSE CUVETTE ASSEMBLY AND METHOD FOR OPTICAL MICROSCOPY OF NANOPARTICLES IN LIQUIDS"; and U.S. Patent Application No. 62/187,391 filed on Jul. 1, 2015, titled "SPECIAL PURPOSE CUVETTE ASSEMBLY AND METHOD FOR OPTICAL MICROSCOPY OF NANOPARTICLES IN LIQUIDS"; the disclosures of all of which are herein incorporated by reference in their entirety.

1.0 TECHNICAL FIELD

The present invention relates to a system for detecting electromagnetic radiation, and more particularly to the observation of nanoparticles in liquid samples using a microscope equipped with digital video cameras/sensors.

3.0 BACKGROUND

Nanoparticles are ubiquitous and by far the most abundant particle-like entities in natural environments on Earth. They are widespread across many applications associated with human activities. There are many types of naturally occurring nanoparticles and man-made (engineered) nanoparticles. Nanoparticles occur in air, aquatic environments, rainwater, drinking water, bio-fluids, pharmaceuticals, drug delivery and therapeutic products, and in a broad range of many industrial products. Nanoparticles usually occur within polydisperse assemblages, which are characterized by co-occurrence of differently-sized particles.

Given the widespread usage of nanoparticles, the ability to control and accurately characterize their properties may be useful to many applications. Conventional methods for measuring nanoparticle properties may be inaccurate for polydisperse samples of mixed nanoparticle sizes, which are common in many applications. Some of these conventional approaches make measurements on an ensemble of a large number of nanoparticles within a sample. Because the light scattered from all nanoparticles is measured simultaneously, it may be difficult to resolve the nanoparticles into their constituent sizes when there is a range of particle sizes. Other approaches fail to account for the large differences in the intensity of the scattered light produced by differently-sized nanoparticles across the range of nanoparticle sizes. In these approaches, the low scattering signals from small nanoparticles may be undetected, or the high scattering signals from larger nanoparticles can obscure the signals from smaller nanoparticles. As a result of these deficiencies, the concentration of nanoparticles of any given size, and hence the entire size distribution, can be subject to unknown error.

These methods of detecting nanoparticles are commonly referred to as dark field microscopy. The instrument to perform such an analysis typically comprises a small cell (for example, a cuvette) that enables illumination of a liquid with a precisely defined, narrow light sheet and observation of scattered light from the nanoparticles, usually at a 90-degree angle relative to the light sheet plane. In other words, the direction of observation is perpendicular to the direction of the plane of illumination. Different sizes of particles can be visualized via the digital camera capturing light scattered by particles, with images having different sizes and intensities (various brightness of pixels) depending on the size of the particles. But as noted above, recording images of light scattered by particles of mixed sizes coexisting in a solution remains somewhat problematic, due to the huge difference in the amount of light scattered by particles of different sizes. Specifically, the intensity of scattered light depends very strongly on the particle size, changing by many orders of magnitude: between 10 nm and 1000 nm diameter nanoparticles, for instance. This problem is also encountered in other areas of photography and videography and is commonly called High Dynamic Range (HDR) imaging. What has been needed is an improved system and method that overcomes the problems that tend to be inherent in dark field microscopy systems.

It is well known that the intensity of scattering of light with wavelengths comparable to the size of scattering particles (for visible light wavelengths that are between 400 nm and 700 nm) depends in a complicated way on the particle's size, see Mie scattering, G. Mie 1908 Annalen der Physik 330(3) pp. 377-445. The intensity varies vastly by several orders of magnitude when the size of particles changes just by a factor of 10: for particles smaller than about 100 nm, this dependence is proportional to $d^6$; that is, scattering cross-section drops as the sixth power of particle's diameter. When one deals with the highly polydisperse colloid that contains particles of many different sizes, visualization of all such particles is problematic when one uses a simple monochromatic light source with a fixed intensity. Either small particles are not visible when the large ones are scattering not too much light to not blind (oversaturate) the camera, or, when one uses a much stronger light source that enables visualization of small particles, images of large ones are highly overexposed and typically have very irregular contours due to interference that are hard to track in time (finding a center of such irregular shapes is very complicated and time consuming, not practical for computerized processing).

To solve the problem of wildly varying scattered light intensities, in the past patent applications the inventor used multiple lasers with different colors of beams and different intensities of emitted light. The images were recorded by a color video camera, if all the lasers were working simultaneously (U.S. Pat. No. 9,645,070), or by greyscale camera, if the lasers were triggered sequentially (U.S. Pat. No. 10,161,852).

But even these systems could overly excite the particles under investigation, leading to misestimating the particle size. For example, in FIG. 1 of U.S. Pat. No. 9,541,490, an apparatus is shown with one laser and a cylindrical lens with a focal length of 50 mm that squeezes a light beam emerging from a laser aperture (typically 2 mm×2 mm or circular shape with diameter of about 1 mm). An additional objective with a power of 5× makes a laser sheet inside the cuvette with a thickness of about 50 microns. If the applied laser has a maximal power of 1 W at aperture, then taking into account losses in the above-mentioned optical system, one obtains about 400 mW of light power inside the cuvette, with the cross-section of the laser sheet having dimensions of the already-mentioned 50 microns by about 400 microns. This results in a laser light intensity of about 2 kW/cm$^2$, which is a considerable power density. For comparison, the so-called solar constant, or intensity of solar illumination on the surface of Earth, is about 0.136 W/cm$^2$ or about 15,000 times less intensity than in the described laser sheet. A special microscope with a long working distance (LWD) objective allows for the observation of light sheet deep inside the cuvette, mitigating somewhat the thermal eddies formed by the intense energy from the laser. Indeed, that is why the '490 patent discloses a special insert, to mitigate the thermal convection of the colloid due to evaporation on the surface.

What is needed, therefore, is an improved system that overcomes these problems and allows for fast intensity changes that can be synchronized to a sensor's frame rate. Ideally, the system should be simple and easy to manufacture, with very few elements forming the changeable light sheet and thus lowering the cost of manufacturing, and making use and servicing simple.

4.0 SUMMARY

This disclosure provides an apparatus and method for generating a high dynamic range video. Such a system has many uses, one of which is determining the particle sizes within a colloid. The high dynamic range video system includes a sensor having an adjustable gain value and a processor connected to the sensor. The processor is configured to perform the following steps of: (a) setting a frame rate that defines a frame period; (b) setting a subframe number per frame; (c) setting a plurality of exposure periods for each subframe based on the frame period and subframe number such that the summation of the exposure periods in the plurality is less than or equal to the frame period; (d) setting a plurality of gain values, one for each subframe, wherein the plurality has at least two different values; (e) capturing a plurality of subframe images from the sensor, wherein each in the plurality of subframe images is captured based on one of the plurality of exposure periods and one of the plurality of gain values; (f) compositing the plurality of subframe images into a composite frame image; (g) repeating steps (e) and (f) to generate a plurality of composite frame images; and (h) creating the high dynamic range video based on the plurality of composite frame images.

The processor is further configured to deactivate the sensor. The system may also include a light source, and the processor may control the light source by activating the light source prior to step (e) and deactivating the light source after step (e). The exposure period for each subframe may be constant or variable. The exposure value (EV) for a first subframe may be different from the EV for a second subframe, wherein the EV is based on the product of the subframe exposure time and the subframe gain value.

A method for generating a high dynamic range video is also disclosed.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

System 10, 10-1
Controller/Processor 15
Sensor/Camera 20
Microscope/Imaging Objective 25
Sample Container/Cuvette/Specimen Chamber 30
Temperature Sensor 31
Objective 35
Optical Chopper 40
Chopper Motor 41
Detector 42
Lens 45
Light Source/Laser 50
Rotating Structure (Disc) 55
Axis of Rotation 60
Rotational Direction 62
First Filter 65
Second Filter 70
Third Filter 75
Synchronization Marks/Structures 80
Magnet 85
Optoelectronic Device 100
Long Exposure 200
Medium Exposure 205
Short Exposure 210
Frame Period 215
Start of New Frame 220
Subframe 1 225, 225-1
Subframe 2 230, 203-1
Subframe 3 235, 235-1
Exposure Value for Subframe 1 245, 245-1
Exposure Value for Subframe 2 250, 250-1
Exposure Value for Subframe 3 255, 255-1
Method 1000
Steps of method 1005-1048
Method using Optoelectronic Device 2000
Steps of Method using Optoelectronic Device 2005-2032
HDR Method 3000
Steps of HDR method 3005-3055

Figure 1:
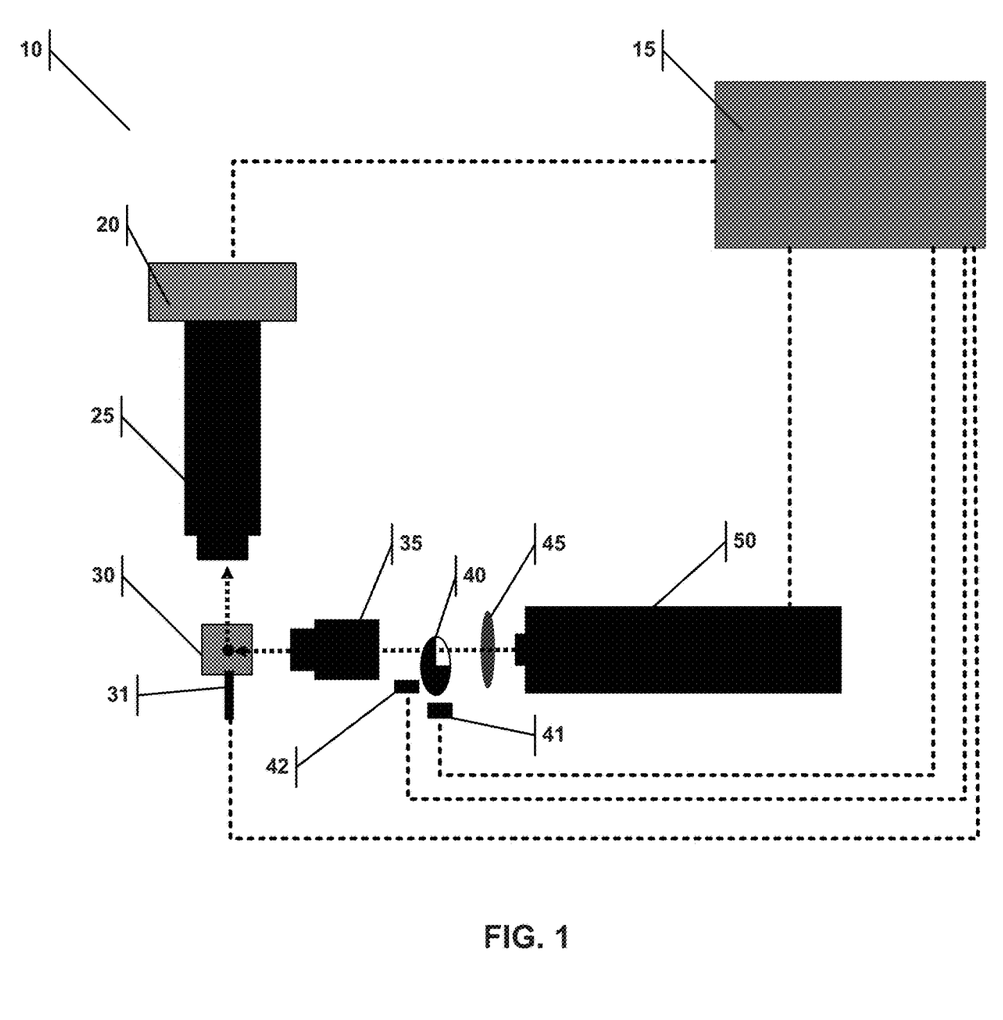
FIG. 1 illustrates a system for detecting particle sizes in a colloid using an optical chopper.

With reference to FIG. 1, the present invention provides a system 10 for determining particles sizes within a colloid. The system 10 comprises a light source 50, a sensor or camera 20, an optical chopper 40, a detector 42, and a controller or processor 15. The controller or processor 15 is in communication with and is connected to the sensor 20, the light source 50, the optical chopper 40, and the detector 42 and can activate and/or deactivate these components and read and store the outputs of these components.

The light source 50 is constructed to direct a beam of electromagnetic radiation at a specimen chamber or a sample container 30, which contains a temperature sensor 31 that reports the temperature of the diluent. The beam of electromagnetic radiation from the light source 50, which may be a laser, may pass through a lens or set of lenses 45 to be directed first onto the optical chopper 40, then may pass from the optical chopper 40, to be focused onto the sample container or the specimen chamber 30 through an objective 35 or a set of objectives 35. The system 10 may optionally include a light sheet former (not pictured) positioned between the light source 50 and the specimen chamber 30 that forms the light beam(s) from the light source 50 into a sheet of electromagnetic radiation directed at the specimen chamber 30. The sample container or specimen chamber 30 is constructed to allow a portion of the beam to scatter when the particles are illuminated. The sensor 20 is positioned to detect the scatter of the beam in the specimen chamber 30, with a frame rate that may be adjusted by the controller or processor 15. The system 10 may optionally include an imaging objective 25 that focuses the scattered portion of the beam from the light source 50 after it passes through the specimen chamber 30 onto the sensor 20. This optional imaging objective 25 may be part of a microscope. The sensor/camera 20 may be a CCD or a camera capable of capturing color images, or it may optionally be a black and white camera.

Figure 2:
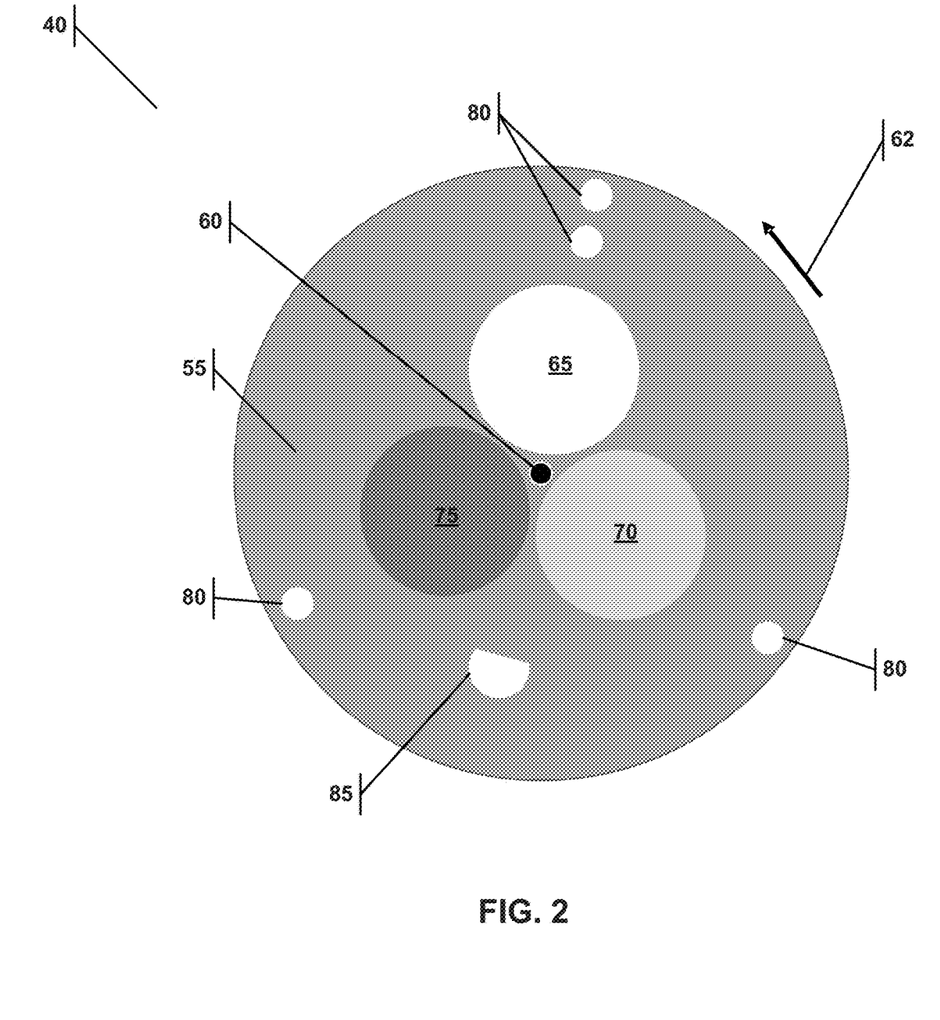
FIG. 2 illustrates an optical chopper.

The optical chopper 40, which is positioned in between the specimen chamber 30 and the light source 50, as shown in FIG. 1, is shown in more detail in FIG. 2. The optical chopper 40 comprises a rotation structure 55 adapted to rotate, a motor 41 connected to the controller/processor 15, which moves or rotates the rotation structure 55 about an axis of rotation 60. The rotation structure 55 may be shaped like a disc, as illustrated in FIG. 2. The rotation structure 55 itself comprises a first filter 65 and a second filter 75. The filters differ in that the first filter 65 permits a different amount or a different type of electromagnetic radiation to pass through than does the second filter 75. Also integrated into the optical chopper 40 are one or more synchronization mark(s) or structure(s) 80 constructed to indicate the rotational position of the rotation structure 55. The optical chopper 40 is to be used alongside a detector 42, which is constructed to detect the position of the synchronization mark/structure 80; the processor 15 can use the information from the detector 42 to control the motor 41, and thus control the rotational direction 62 and the rotational speed of the rotation structure 55. With the information from the detector 42 about the position of the synchronization marks/structures 80, the processor 15 can also determine the appropriate frame rate for the sensor 20, which captures images based on the rotational speed and rotational position of the optical chopper 40. During initial set up of the system 10, the optical chopper 40 can additionally employ a locking structure to maintain the rotational position of the rotation structure 55, and the locking structure of the optical chopper 40 may, as a non-limiting example, comprise a magnet or electromagnet 85. With the optical chopper 40 locked, the system can be set up, and when the system 10 is operational the lock can be disengaged to allow the optical chopper 40 to rotate.

It is an objective of the present invention to solve the problem of wildly varying scattered light intensities, caused by a wide range of particle sizes in the colloid studied. The solution provided by the present invention is to allow for fast changes in the level of intensity of the light focused onto the specimen under study, and synchronize those light intensity changes to the frame rate of the sensor 20 picking up the scattered light from the specimen under study. Thus, the particles of a first size may be studied using a first beam intensity, and the particles of a second size may be studied using a second beam intensity. The beam intensities can be alternated in quick succession, so as to enable tracking of the motion of differently sized particles. Instead of using a light source 50 designed specifically to alternate the light beams it emits, the present invention provides a much more efficient and elegant solution of using alternating filters, which are swapped via the controllable rotational motion of the rotation structure 55 on which the filters can be mounted, and the images captured by the sensor 20 can then be synchronized based on the rotational position of the optical chopper 40 (and thus noting which filter was used at the time any particular image was taken). Each filter (65, 70, and 75 in FIG. 2) can filter the light spectrum or the light intensity to optimize detection of a particular size range of particles. As a non-limiting example, the first filter 65 may allow the transmission of greater than 80% of the light beam intensity, and the second filter 70 may allow for much less than 80% of the light beam intensity to be transmitted, e.g. 50% or 10% of the light intensity from the light source 50. The rotation structure 55 of the optical chopper 40 may have two filters 65, 70 or more than two filters, each of which permits a different amount or type of electromagnetic radiation to pass through. As the rotation structure 55 rotates, the beam of electromagnetic radiation from the light source 50 alternates between passing through each of the filters. The light source 50 may be monochromatic, i.e. a laser, with the filters in the optical chopper 40 being light intensity filters; alternatively, the light source 50 may be polychromatic, with the filters in the optical chopper being chromatic filters. The synchronization marks/structures 80 may be placed in line with the position of the filters, as illustrated in FIG. 2, or placed in between the filters to delineate the transition between filters.

The processor 15 has a crucial role in operating the system 10 to achieve the objective of accurately determining the size of differently-sized nanoparticles, and concentrations of any given size of nanoparticle, in a sample or specimen. The processor 15 is connected to the light source 50, the sensor 20, the detector 40, and the optical chopper 40, the temperature sensor 31 and is configured to perform the steps of the method 1000. The method 1000 employed by the processor 15 is described as discrete steps 1005-1048 in FIGS. 3A and 3B. The system 10, wherein the processor 15 is configured to perform the steps in FIG. 3A, may be considered one embodiment, and the system 10 with the processor configured to perform the steps in FIG. 3B may be considered another embodiment. Although the steps in FIGS. 3A-3B indicate the use of two filters (65, 70), it would be obvious to one skilled in the art how to modify the steps of the method 1000 to incorporate the use of more than two filters, without departing from the scope and spirit of this disclosure.

Figure 3A:
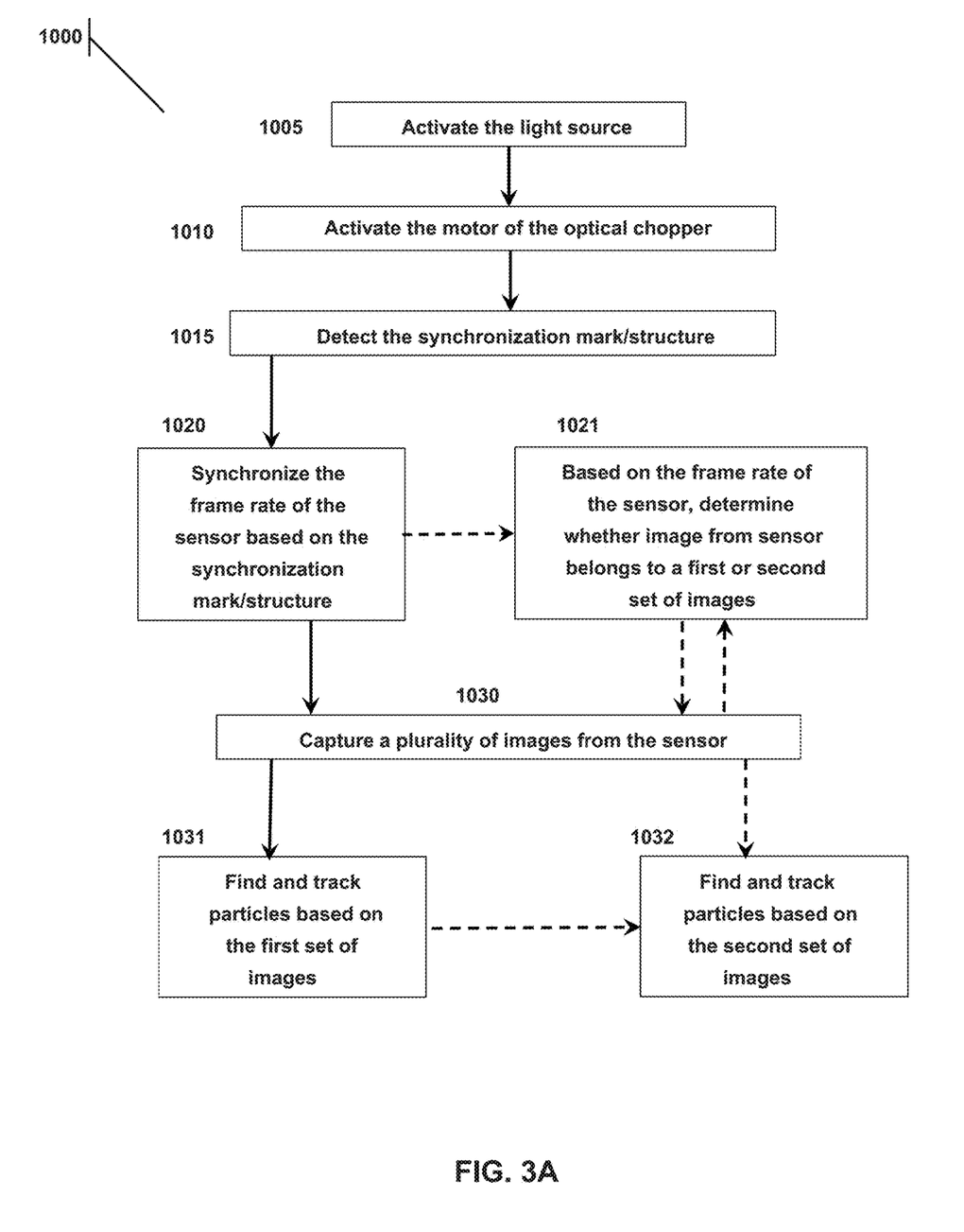
FIG. 3A is a flow chart detailing a first method of using an optical chopper to rapidly adjust the intensity of light incident on a colloid under investigation.

In FIG. 3A, the method 1000 executed by the processor 15 starts off with activating the light source 50 (step 1005), activating the motor 41 (step 1010) to rotate the rotation structure 55, and detecting the synchronization mark/structure 80 (step 1015) using the detector 42 to determine the rotational position of the rotation structure 55 of the optical chopper 40. Next, the processor 15 synchronizes the frame rate of the sensor 20 based on the information about the synchronization mark or structure 80 provided by the detector 42 to the processor 15 (step 1020). The detector 42 may continuously track the synchronization mark(s) or structure(s) 80 or (equivalently) may provide time information about when the synchronization mark(s) or structure(s) 80 passed a fixed point, with which the processor 15 can determine the location of the synchronization mark/structure 80. After step 1020, the processor 15 moves on to step 1030, capturing a plurality of images from the sensor 20.

The step 1020 of synchronizing the frame rate of the sensor 20 may further comprise the step 1021, synchronizing the frame rate for the sensor 20 such that a first set of images from the plurality corresponds to the detection of the scatter of the beam passing through the first filter 65, and a second set of images from the plurality corresponds to the detection of scatter of the beam passing through the second filter 70. In other words, in step 1021, the processor 15 determines whether the image reading from the sensor 20 at that moment would belong to a first set of images that was taken when the beam was passing through the first filter 65, or to a second set of images that was taken when the beam was passing through the second filter 70. Alternatively, step 1021 may be operated in tandem with or in parallel to step 1030, as the sensor 20 captures a plurality of images. After step 1030, wherein the processor 15 captures a plurality of images from the sensor 20, the processor 15 then can find and track particles of a first size based on a first set of images that was taken from the sensor 20 when the beam was passing through the first filter 65 at a first intensity level (step 1031). Then, the processor 15 can find and track particles of a second size based on a second set of images that was taken from the sensor 20 when the beam was passing through the second filter 70 (step 1032). The first set of images and the second set of images may provide information about different sizes of particles, and the processor 15 can integrate the information from steps 1031 and 1032, so that the sizes of the particles in the sample contained within the specimen chamber 30 can be determined. Moreover, instead of performing the steps 1031 and 1032 in succession, the processor 15 may perform the steps 1031 and 1032 in parallel.

The videos (i.e., the first set of images and the second set of images) are processed to find and track all particles detected on each video, the positions of same particle on each of three (or other number) videos being the same and thus allowing for not over-counting particles for concentration measurements. By using the general theory of optimized track lengths (cf. e.g. X. Michalet and A. J. Berglund 2012 Phys Rev E85, 06916, 1-14 *Optimal diffusion coefficient estimation in single-particle tracking*), the processor 15 can obtain accurate size of each particle being tracked given the temperature and viscosity of diluent of the measured sample. The temperature of the cuvette 30 may further be recorded during image acquisition from the temperature sensor 31. The viscosity of typical diluents like water or PBS (phosphate-buffered saline) are well known for known temperatures. If viscosity of diluent is not known, it can be measured by spiking the diluent with a known size of beads and processing recorded images as if viscosity were that of water—the change of the ratio of the measured and known size of beads used is equal to the ratio of the unknown viscosity of the diluent to the viscosity of water at that given temperature.

Figure 3B:
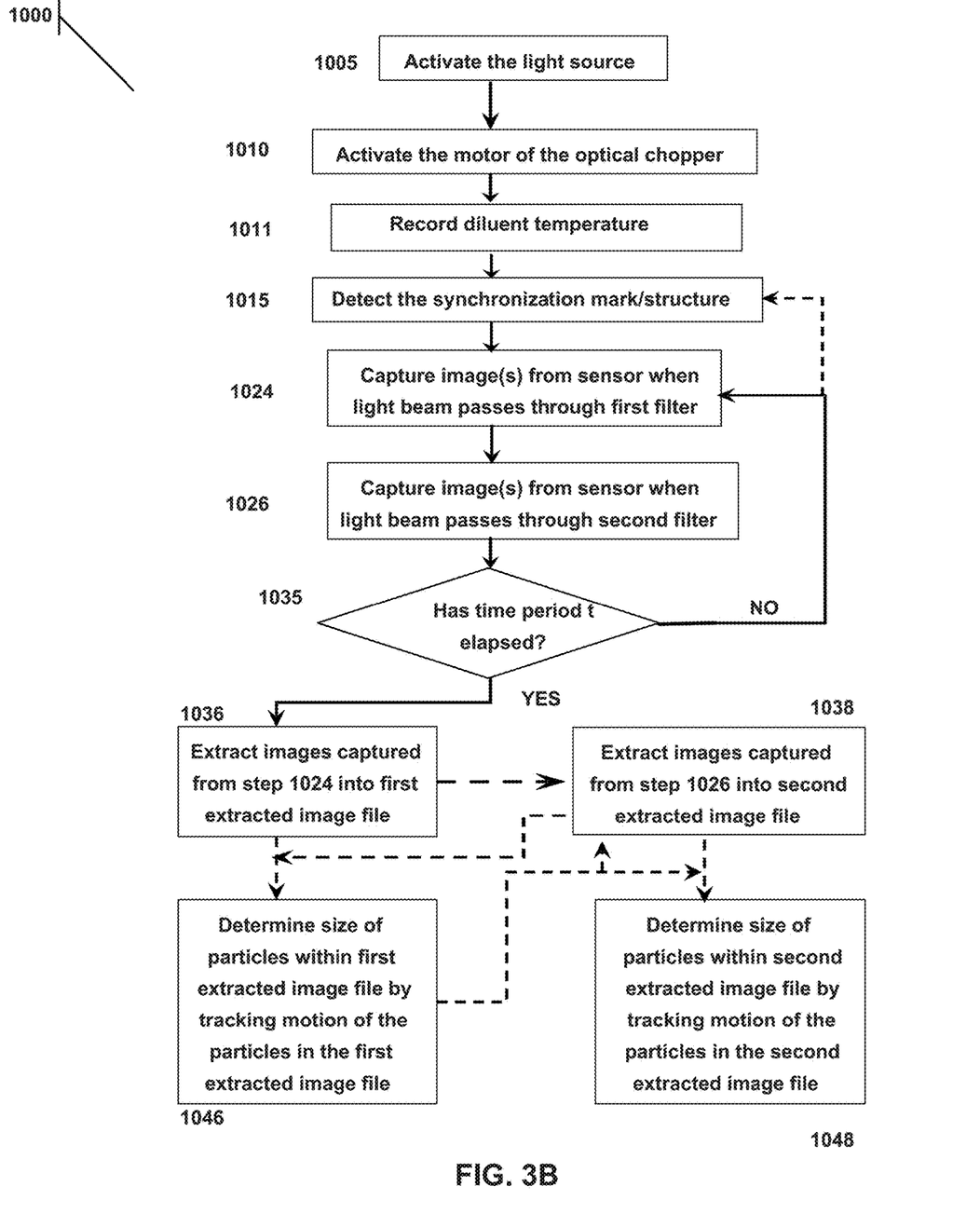
FIG. 3B is a flow chart detailing a second method of using an optical chopper to detect the size of particles in a colloid under investigation.

FIG. 3B shows a second method 1000 for the system 10. The processor 15 performs the same steps of activating the light source 50 (step 1005), activating the motor 41 of the optical chopper 40 (step 1010), recording the diluent temperature (step 1011), and then detecting the synchronization mark or structure 80 (step 1015). Next, the processor 15 performs step 1024, capturing image(s) from the sensor 20 when the light beam from the light source 50 passes through the first filter 65, the time frame of which can be determined based on the information provided by the detector 42 to the processor 15 in the earlier step of 1015. Then, the processor 15 performs step 1026, capturing image(s) from the sensor 20 when the light beam from the light source 50 passes through the second filter 70, the time frame of which can also be determined based on the information provided in step 1015. After steps 1024 and 1026, the processor 15 makes a determination of whether a predetermined time period t has elapsed, repeating steps 1024 and 1026 until the expiration of that time period t (step 1035). The time period t may depend in part upon the rotational speed and the rotational position of the optical chopper 40 that is determined by the detector 42 via the synchronization mark(s)/structure(s) 80. The processor 15 may loop through steps 1024, 1026, and 1035 until the expiration of the time period t occurs; then, it proceeds to step 1036.

In step 1036, the processor 15 extracts images captured from iterations of step 1024 into a first extracted image file, and in step 1038, the processor 15 extracts images captured from iterations of step 1026 into a second extracted image file. The processor 15 can then determine the size of particles within the first extracted image file by tracking the motion of the particles within the first extracted image file in step 1046. The processor 15 can next determine the size of particles within the second extracted image file by tracking the motion of the particles within the second extracted image file in step 1048. Note that in the method 1000 disclosed by FIG. 3B, when it comes to steps 1036-1048, there is some flexibility in the order in which the steps are performed, as long as the corresponding size of particles is determined following the extraction of images to the image file. Thus, these steps may be executed in the sequence of 1036, 1038, 1046, and 1048 or, for example, in the sequence of 1036, 1046, 1038, and 1048. Furthermore, there is also flexibility in the time that elapses between the steps of image extraction (1036 and 1038) and the steps of determining particle size (1046 and 1048). The processor 15 of the system 10 may, for instance, capture and extract many series of images in steps 1024-1038 before processing the extracted images to determine the size of particles in steps 1046 and 1048 without departing from the spirit and scope of this invention. Step 1035 can also be implemented with the variation to repeat steps 1015, 1024, and 1026 instead of steps 1024 and 1026. Doing so would give the advantage of increased accuracy from having more frequent readings of the synchronization mark(s) or structure(s) 80, at the cost of increased processing time to execute step 1015 in the loop until the time period t has transpired.

The system 10 that has been disclosed in conjunction with FIGS. 1 and 2, where the processor 15 is configured to perform the steps provided in either FIG. 3A or FIG. 3B, may include a rotation structure 55 that has more than two filters, each of which permits a different amount or type of electromagnetic radiation to pass through, and as the rotation structure 55 rotates, the beam of electromagnetic radiation from the light source 50 to the specimen chamber 30 alternates between passing through each of the filters. As stated before, a first filter 65 may allow the transmission of greater than 80% of the light beam intensity from the light source 50, and a second filter 70 may allow for the transmission of less than 80% of the light beam intensity.

Either embodiment may further comprise an imaging objective 25 that focus the scattered portion of the light beam passing through the specimen chamber 30 onto the sensor 20, and either embodiment may further comprise a light sheet former that forms the beams from the light source 50 into a sheet of electromagnetic radiation directed at the specimen chamber 30, either before or after the beams pass through the optical chopper 40. The sensor 20 may optionally be a black and white camera, and the light source 50 may also optionally be a laser. The optical chopper 40 may comprise a locking structure to maintain the rotational position and stability of the rotation structure 55, and this locking structure may comprise a magnet 85.

In another embodiment, the optical chopper can be replaced by an electronic device that either modulates the amplitude of illuminating laser (AM method) or modulates the lengths of pulses coming through the modulator (FM method). In both methods, energy of the light that scatters on particles is varying in time sequentially: in the former case, the power of light is changing because of filtering (blocking some intensity during subsequent steps of a sequence), but light pulses have same time length, while in the latter method, the power of light is maintained, but the length of pulses is changing (pulses are getting shorter during each sequence).

Figure 4A:
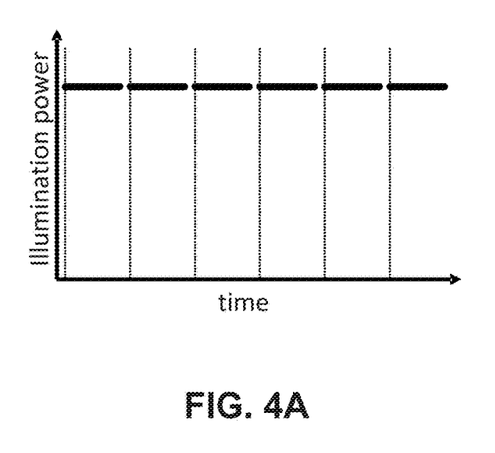
FIG. 4A illustrates the illumination power/time graph for previous colloid inspection systems.
Figure 4B:
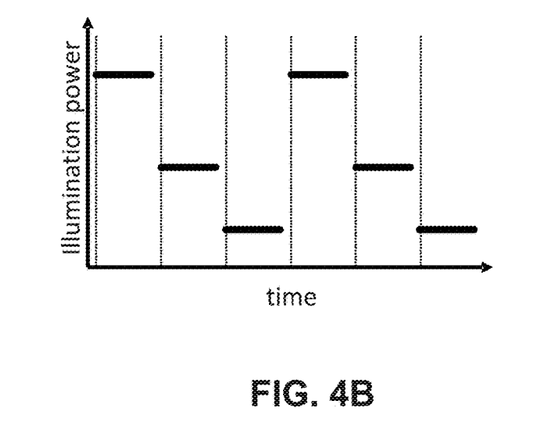
FIG. 4B illustrates an amplitude modulation illumination power/time graph for use in the present colloid inspection system.
Figure 4C:
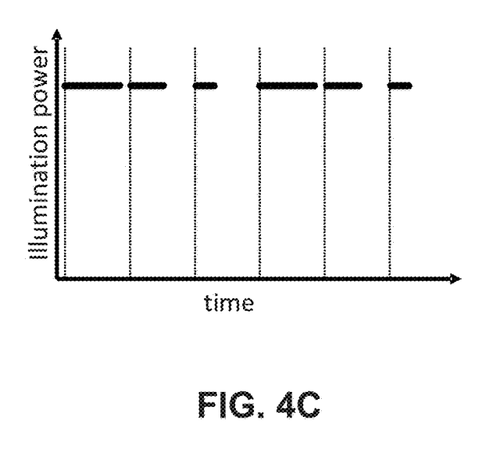
FIG. 4C illustrates a pulse length modulation illumination power/time graph for use in the present colloid system.

FIGS. 4A-4C illustrate these two processes as compared with earlier designs (vertical thin lines show beginning of the exposure of each frame of video being recorded). FIG. 4A presents pulses with constant power and constant time lengths, which were used in earlier designs with multiple lasers where the length of each pulse was equal to or smaller than the time exposure of each frame of recorded video. FIG. 4B presents pulses of equal time lengths but different transmitted power, as could be produced, for example, by the optical chopper 40 described above.

Instead of an optical chopper 40, an electro-optic modulator may be used that employs one of the known methods of changing the transmission of special crystals, due to applied voltage (e.g. via the Mach-Zehnder effect), or by changing the polarization of different type of crystals, also due to applied voltage (e.g. via the Pockels effect). Such optoelectronic devices are used to transmit information in many electro-optical systems. This type of device can replace the optical chopper 40. A synchronization signal from the sensor/camera can be used to trigger modulation with additional circuitry that enables change of the amplitude of illuminating light that emerges from the modulator.

Figure 4D:
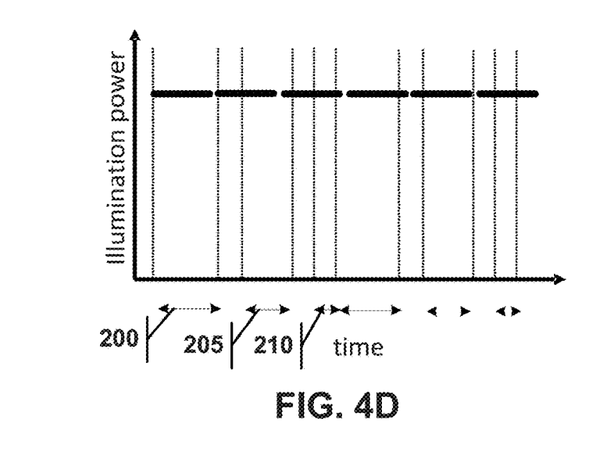
FIG. 4D illustrates an exposure modulation illumination power/time graph for use in the present colloid system.

FIG. 4C shows pulses of the very same power (no amplitude modulation) but with varying time length. This pulse length modulation can be accomplished by simple electronics circuitry that is synchronized (triggered) by the sensor/camera 20, while time periods for each pulse in the sequence are either generated by an analog filter or by a digital clock whose frequency is much higher than the desired frequency of pulse repeatability—larger or smaller numbers of such clock pulses are being counted to get a desirable length of each light pulse in the sequence that repeats itself in the same manner as the sequence of filters on the revolving optical chopper repeating sequences of illumination energies. Although theoretically, the modulation presented in FIG. 4C could be replaced by varying exposure times (as shown in FIG. 4D, with a long exposure (200), a medium exposure (205) and a shorter exposure (210)) during each sequence while using same length of pulses as in FIG. 4A or using a continuous pulse. In practice, however, there are no cameras that allow for such rapid changes of exposure between subsequent frames of video, certainly not in the regime that is of practical interest for recording the Brownian motion of nanoparticles (typically 25 to 30 frames per second, with exposure times being less than 40 ms (the longest exposure time for 25 fps), down to few milliseconds required for very large i.e. bright particles (video cameras typically do not have options of fast varying aperture of their optical systems, and changing exposure time is the only method to avoid having overexposed images).

In amplitude modulation, the pulse length modulation or exposure modulation, that the laser beam delivers varies the total number of photons (total energy) that, after scattering on particles, are detected by the camera, thus allowing for the visualization of both small and large particles (small or large cross-sections of light scattering) during one video recording of their Brownian motion.

Figure 7:
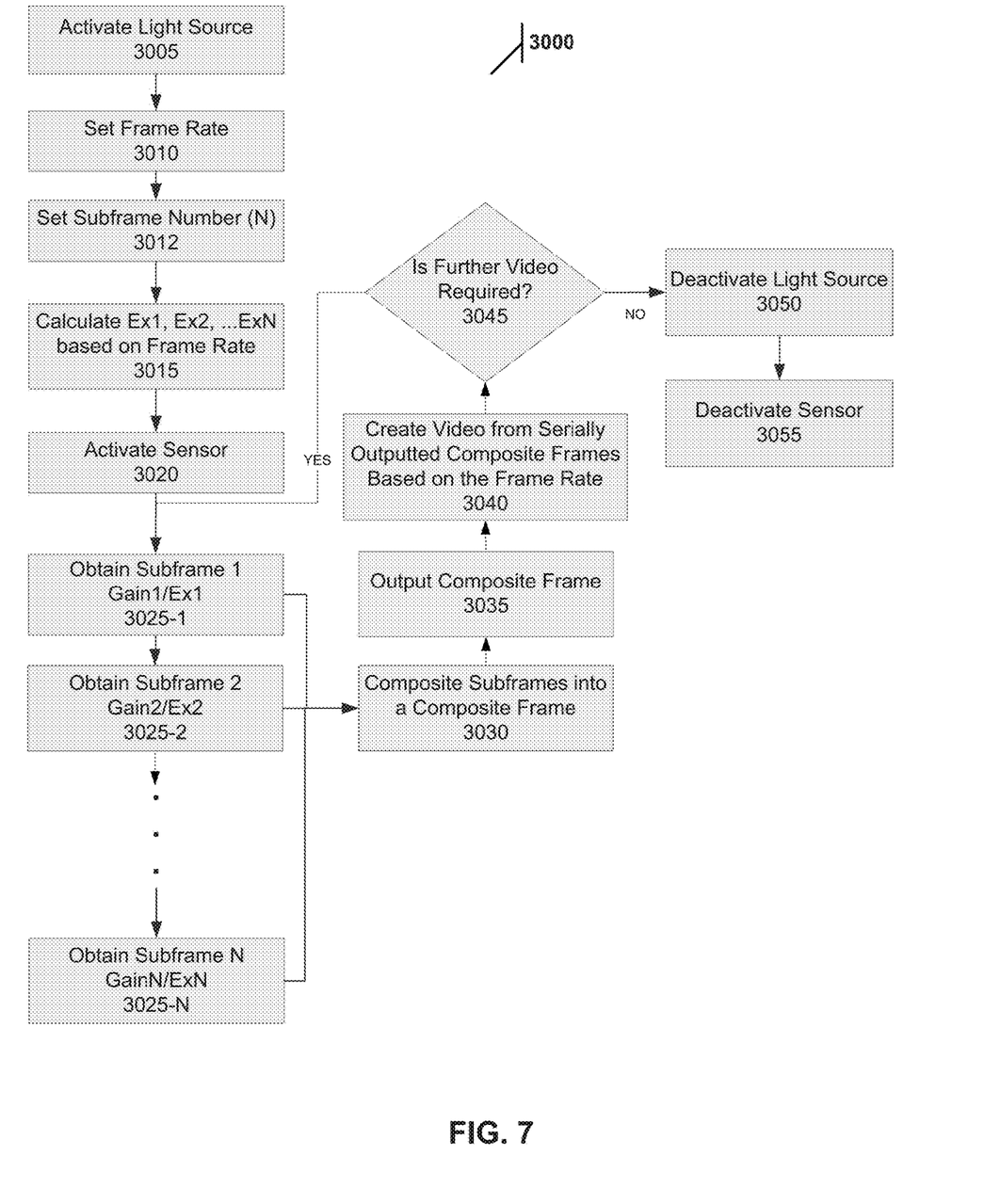
FIG. 7 is a flow chart detailing a method of using a composite of subframes taken at different gain and exposure combinations to result in a high dynamic range video stream.

In addition to changing the amount of light (i.e., number of photons) per frame (either by amplitude, pulse length or exposure time modulation), the gain of the sensor/camera 20 may be adjusted. An exemplary method 3000 for operating such a system is shown in FIG. 7. The light source is activated at step 3005, and a frame rate and a subframe number (N) are set (steps 3010 and 3012). The subframe number (N) is the number of subframes that will be taken within the period set implicitly by the frame rate. In step 3015, the exposure periods Ex for each subframe is determined, and these exposure periods should be less than the period set by the frame rate. So, for example, if the frame rate is set to 24 per second, then the length of each frame would be about 41 ms (there's always a short time between frames when sensor/camera is recording image, and no exposure can take place). The three subframes exposures may each be the same period of time, or they may vary. The sensor 20 is activated at step 3020, and the subframes 1, 2, . . . , N are obtained at steps 3025-1 through 3025-N. These frames are then composited into a single frame at step 3030 and are output (step 3035) to create a video at step 3040 based on the set frame rate. The method continues obtaining subframes and compositing those frames into a video until no further video is required at step 3045. The light and sensor may then be deactivated (steps 3050 and 3055). By changing the gain of the sensor/camera 20 and the exposure for each subframe, different features in the frame may be enhanced, and compositing those subframes results in a high dynamic range image that may reveal each of those features—features that might be missed or captured in less detail in a conventional video stream. The change in gain is graphically shown in FIGS. 4E and 4F.

Figure 4E:
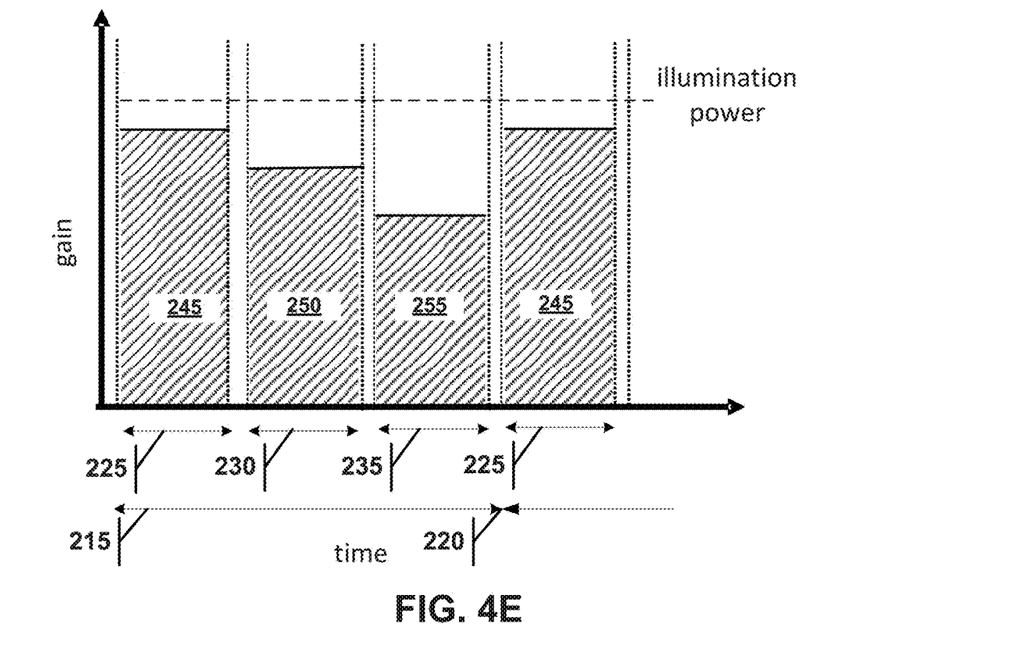
FIG. 4E illustrates a gain modulation graph with constant subframe exposure length for use in the present colloid system.

In FIG. 4E, the frame shown as frame period 215 is divided into three subframes 225, 230 and 235 (i.e., N=3). Together all three subframes are shorter than the frame period 215, and the start of the new frame 220 would likewise have a plurality of subframes. Each subframe is shown with a different gain value. Gain is a digital sensor setting that controls the amplification of the signal from the sensor, typically given in dB. Whereas in the previous embodiments, the amplitude of value of the signal reported to the processor was manipulated by changing the amount of light (i.e., number of photons) per frame through amplitude, pulse length or exposure modulation, by changing the gain, the value of the signal reported to the processor can also be manipulated. The total value of the signal that can be recorded is largest in subframe 225 (represented by the hatched area 245): this is referred to herein as the Exposure Value (EV) of the subframe. Subframe 230 has a lower EV shown as 250, followed by subframe 235 with even lower EV shown as 255. Using an EV shown for subframe 225 might be useful to detect extremely faint particles (e.g. small particles), while the EV shown for subframe 235 may be useful to properly define the large, bright particles. Compositing these subframes together results in a high dynamic range image revealing details that a conventional video stream might miss.

Figure 4F:
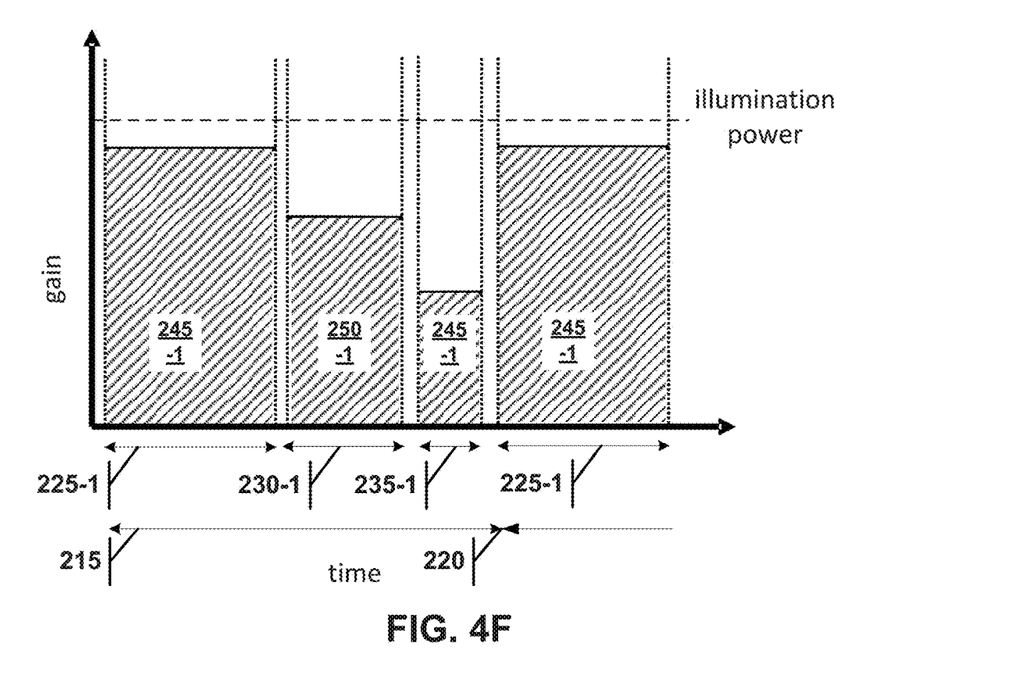
FIG. 4F illustrates a gain modulation graph with variable subframe exposure length for use in the present colloid system.

The EV value may also be changed by manipulating the subframe exposure period, as shown in FIG. 4F. Here, the three subframes 225-1, 230-1 and 235-1 (i.e., N=3) each have a different time length, and each also has a different gain value—subframe 225-1, followed by subframe 230-1, then subframe 235-1. The EV may be a product of the gain setting and the subframe exposure length.

Looking at FIG. 7, the EV for a first subframe (step 3025-1) is different from the EV for a second subframe (step 3025-2), wherein the EV is based on the product of the subframe exposure period and the subframe gain value.

Figure 5:
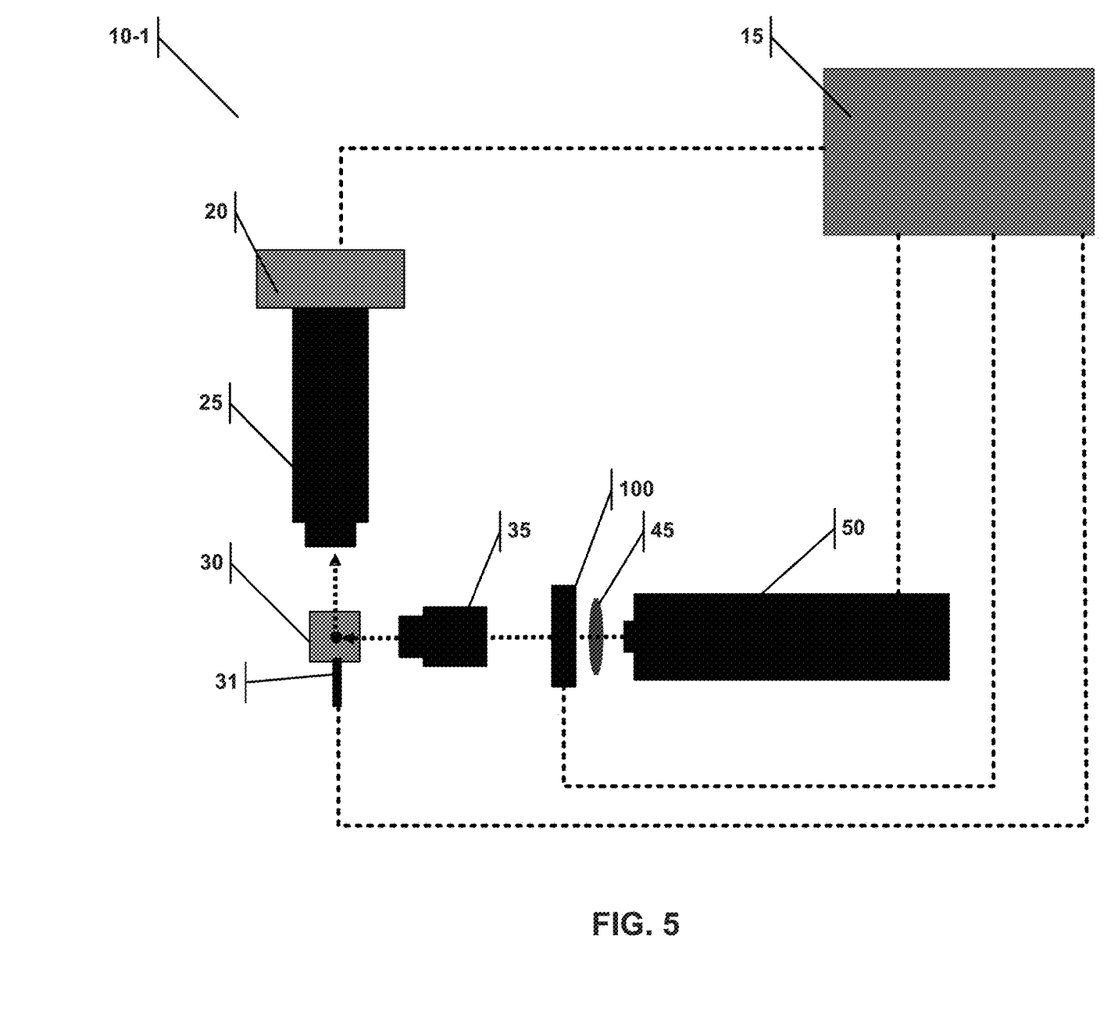
FIG. 5 illustrates a system for detecting particle sizes in a colloid using an optoelectronic device.

FIG. 5 illustrates a system 10-1 for determining particles sizes within a colloid that is similar to the system described above with reference to FIG. 1. The system 10-1, however, replaces an optoelectronic device 100 that is controlled and synchronized by the controller/processor 15. The optoelectronic device 100 may modulate the amount of electromagnetic radiation reaching the specimen chamber 30 to at least a first and second value. For example, the optoelectronic device 100 may allow the transmission of greater than 80% of the light beam intensity, and the second value allows for the transmission of less than 80% of the light beam intensity.

Figure 6:
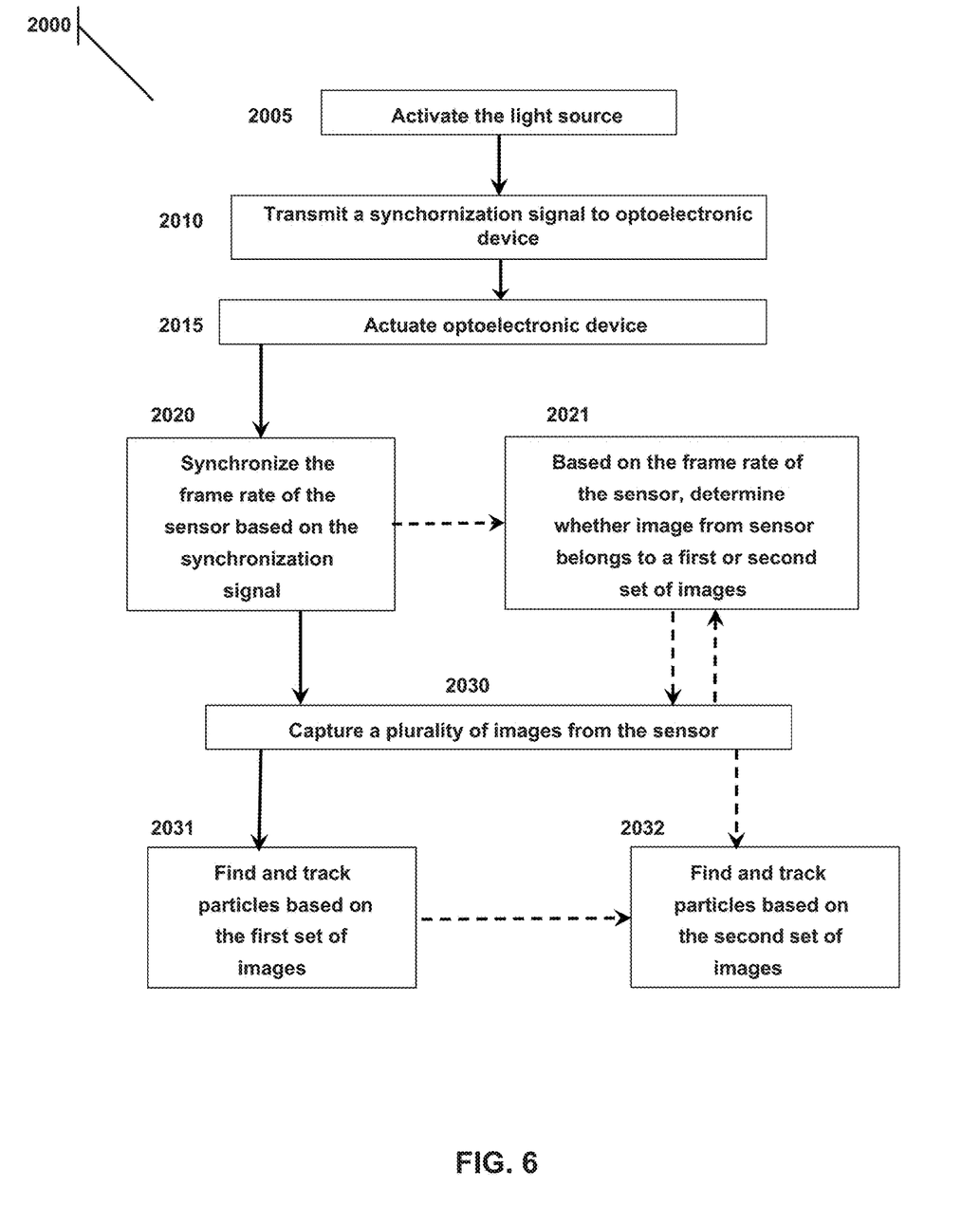
FIG. 6 is a flow chart detailing a method of using an optoelectronic device to rapidly adjust the intensity of light incident on a colloid under investigation.

In FIG. 6, the method 2000 executed by the processor 15 starts off with activating the light source 50 (step 2005), transmitting a synchronization signal to the optoelectronic device 100 (step 2010), and actuating the device 100 (step 2015). Next, the processor 15 synchronizes the frame rate of the sensor 20 based on the synchronization signal (step 2020). After step 2020, the processor 15 moves on to step 2030, capturing a plurality of images from the sensor 20.

The step 2020 of synchronizing the frame rate of the sensor 20 may further comprise the step 2021, synchronizing the frame rate for the sensor 20 such that a first set of images from the plurality corresponds to the detection of the scatter of the beam passing during a first frame (or set of frames) with a first value of modulation during that frame, and a second set of images that corresponds to the detection of scatter of the beam passing during a second frame (or set of frames) with a second value of modulation during that frame. In other words, in step 2021, the processor 15 determines whether the image reading from the sensor 20 at that moment would belong to a first set of images corresponding to a first modulation value or to a second set of images corresponding to a second modulation value. Alternatively, step 2021 may be operated in tandem with or in parallel to step 2030, as the sensor 20 captures a plurality of images. After step 2030, wherein the processor 15 captures a plurality of images from the sensor 20, the processor 15 then can find and track particles of a first size based on a first set of images that was taken from the sensor 20 when the beam subject to a first modulation value (step 2031). Then, the processor 15 can find and track particles of a second size based on a second set of images that was taken from the sensor 20 when the beam was subject to a second modulation value (step 2032). The first set of images and the second set of images may provide information about different sizes of particles, and the processor 15 can integrate the information from steps 2031 and 2032, so that the sizes of the particles in the sample contained within the specimen chamber 30 can be determined. Moreover, instead of performing the steps 2031 and 2032 in succession, the processor 15 may perform the steps 2031 and 2032 in parallel. It should be apparent that more than two modulation values may be used; for example, the system may have three modulation values with a third set of images segregated that corresponds to the third modulation value.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A method of generating a high dynamic range video from a sensor having an adjustable gain value, the method comprising:
   a. setting a frame rate that defines a frame period;
   b. setting a subframe number per frame;
   c. setting a plurality of exposure periods for each subframe based on the frame period and the subframe number such that a summation of the exposure periods in the plurality is less than or equal to the frame period;
   d. setting a plurality of gain values, one for each subframe, wherein the plurality has at least two different values;
   e. capturing a plurality of subframe images from the sensor, wherein each in the plurality of subframe images is captured based on one from the plurality of exposure periods and one from the plurality of gain values;
   f. compositing the plurality of subframe images into a composite frame image;
   g. repeating steps (e) and (f) to generate a plurality of composite frame images;
   h. creating the high dynamic range video based on the plurality of composite frame images; and
   i. providing a light source and activating the light source prior to step (e), then deactivating the light source after step (e).

2. The method of claim 1, wherein the exposure period for each subframe is constant.

3. The method of claim 2, wherein the subframe number is 3, and the plurality of gain values comprises three different gain values.

4. The method of claim 1, wherein the exposure period for each subframe is variable.

5. The method of claim 1, wherein the subframe number is 3 and the plurality of exposure periods comprises a long, a medium, and a short exposure period, and the plurality of gain values comprises a high, a medium, and a low gain value, wherein:
   the subframe with the long exposure period comprises the high gain value;
   the subframe with the medium exposure period comprises the medium gain value; and
   the subframe with the short exposure period comprises the low gain value.

6. The method of claim 1, wherein an exposure value (EV) for a first subframe is different from an EV for a second subframe, wherein the EV is based on the product of the subframe exposure period and the subframe gain value.

7. A high dynamic range video system comprising:
   a sensor having an adjustable gain value;
   a light source;
   a processor connected to the sensor and light source, where the processor is configured to perform the following steps of:
   a. setting a frame rate that defines a frame period;
   b. setting a subframe number per frame;
   c. setting a plurality of exposure periods for each subframe based on the frame period and subframe number such that a summation of the exposure periods in the plurality is less than or equal to the frame period;
   d. setting a plurality of gain values, one for each subframe, wherein the plurality has at least two different values;
   e. capturing a plurality of subframe images from the sensor, wherein each in the plurality of subframe images is captured based on one from the plurality of exposure periods and one from the plurality of gain values;

f. compositing the plurality of subframe images into a composite frame image;

g. repeating steps (e) and (f) to generate a plurality of composite frame images;

h. creating the high dynamic range video based on the plurality of composite frame images; and i. activating the light source prior to step (e), then deactivating the light source after step (e).

8. The system of claim 7, wherein the processor is further configured to deactivate the sensor.

9. The system of claim 7, wherein the exposure period for each subframe is constant.

10. The system of claim 9, wherein the subframe number is 3, and the plurality of gain values comprises three different gain values.

11. The system of claim 7, wherein the exposure period for each subframe is variable.

12. The system of claim 7, wherein the subframe number is 3 and the plurality of exposure periods comprises a long, a medium, and a short exposure period, and the plurality of gain values comprises a high, a medium, and a low gain value, wherein:

the subframe with the long exposure period comprises the high gain value;

the subframe with the medium exposure period comprises the medium gain value; and the subframe with the short exposure period comprises the low gain value.

13. The system of claim 7, wherein an exposure value (EV) for a first subframe is different from an EV for a second subframe, wherein the EV is based on the product of the subframe exposure period and the subframe gain value.

* * * * *